(12) United States Patent
Troy de Freitas et al.

(10) Patent No.: US 10,554,518 B1
(45) Date of Patent: Feb. 4, 2020

(54) COMPUTER SYSTEM AND METHOD FOR EVALUATING HEALTH OF NODES IN A MANUFACTURING NETWORK

(71) Applicant: Uptake Technologies, Inc., Chicago, IL (US)

(72) Inventors: Nelson Troy de Freitas, Chicago, IL (US); Aparna Pandey, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 3 days.

(21) Appl. No.: 15/910,361

(22) Filed: Mar. 2, 2018

(51) Int. Cl.
*H04L 12/26* (2006.01)
*H04L 12/24* (2006.01)
*G05B 19/418* (2006.01)

(52) U.S. Cl.
CPC ........ *H04L 43/065* (2013.01); *H04L 41/0681* (2013.01); *G05B 19/41855* (2013.01); *G05B 2219/31151* (2013.01); *G05B 2219/31346* (2013.01)

(58) Field of Classification Search
CPC .............. H04L 43/065; H04L 41/0681; G05B 2219/31346; G05B 19/41855; G05B 2219/31151
See application file for complete search history.

(56) References Cited

U.S. PATENT DOCUMENTS

| | | |
|---|---|---|
| 5,566,092 A | 10/1996 | Wang et al. |
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Austin J Moreau
(74) *Attorney, Agent, or Firm* — Lee Sullivan Shea & Smith LLP

(57) ABSTRACT

A computing system may be configured to obtain operating data for a manufacturing network that comprises a plurality of edge nodes, a plurality of intermediate nodes, and a root node. Based on the operating data, the computing system may determine a respective critical state indicator for each node in at least a given segment of the manufacturing network. Based on the respective critical state indicator for each node in the given segment, the computing system may recursively determine a respective health score for each node in the given segment of the manufacturing network. Based on the respective health score for each node in the given segment of the manufacturing network, the computing system may identify one or more nodes in the given segment that are anomalous and cause a client station to present a report of the one or more nodes that are identified to be anomalous.

20 Claims, 8 Drawing Sheets

(56) References Cited

U.S. PATENT DOCUMENTS

| | | |
|---|---|---|
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,062,683 B2 | 6/2006 | Warpenburg et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,246,156 B2 | 7/2007 | Ginter et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,792,770 B1 | 9/2010 | Phoha et al. |
| 7,793,138 B2 | 9/2010 | Rastogi et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,934,352 B2 | 1/2015 | Pei et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,943,367 B2 | 1/2015 | Jiang et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2005/0289219 A1 | 12/2005 | Nazzal |
| 2006/0287842 A1 | 12/2006 | Kim |
| 2007/0192128 A1 | 8/2007 | Celestini |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0250497 A1 | 10/2008 | Mullarkey et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0327573 A1 | 11/2014 | Leibner et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0195296 A1 | 7/2015 | Vasseur et al. |
| 2015/0262060 A1 | 9/2015 | Husain et al. |
| 2016/0154690 A1* | 6/2016 | Horrell ............... G06F 11/0751 714/57 |
| 2016/0261482 A1 | 9/2016 | Mixer et al. |
| 2017/0214706 A1 | 7/2017 | Wittenschlaeger |
| 2019/0064787 A1* | 2/2019 | Maturana ........... G05B 23/0227 |
| 2019/0130659 A1* | 5/2019 | Ide ........................ G06N 20/00 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

(56) References Cited

OTHER PUBLICATIONS

Infor Equipment, Infor.com (2012).
Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan. 2012).
"Architecting a Robust Manufacturing Network for the Internet of Things," GE's Intelligent Platforms business & Cisco Systems Inc., www.cisco.com/c/dam/en_us/solutions/industries/docs/manufacturing/architecting-robust.pdf, Aug. 2015, 17pages.
Chatzigiannakis et al. "Diagnosing Anomalies and Identifying Faulty Nodes in Sensor Networks" Abstract, IEEE Sensors Journal vol. 7 Issue 5, Apr. 16, 2007, 4 pages.

* cited by examiner

COMPUTER SYSTEM AND METHOD FOR EVALUATING HEALTH OF NODES IN A MANUFACTURING NETWORK

BACKGROUND

Manufacturing facilities typically include numerous pieces of manufacturing or production equipment, also called manufacturing assets. Each manufacturing asset may include one or more electrical, mechanical, electromechanical, and/or electronic components configured to perform one or more operations directly or indirectly associated with a manufacturing task. Examples of manufacturing assets include industrial robots, conveyor assemblies, stamping/forming machinery, and injection molding presses.

In many facilities, manufacturing assets are connected to a manufacturing network that facilitates communication with and control of the manufacturing assets. Communicatively interconnecting manufacturing assets in one or more manufacturing facilities results is many recognized benefits. As one example, connecting manufacturing assets to a manufacturing network may enable such assets to be controlled remotely via the network and may also enable individuals responsible for overseeing the manufacturing assets to receive data regarding the operating of the manufacturing assets via the manufacturing network. For instance, if a given manufacturing asset detects an operational issue (e.g., a temperature of a component exceeding a threshold), the manufacturing asset may send an alert via the manufacturing network to a technician's client station, which may enable the technician to address the operational issue more quickly. As another example, connecting manufacturing assets to a manufacturing network may facilitate communication between manufacturing assets. For instance, a first manufacturing asset could send an alert that a first production task has been completed, and that alert may trigger a second manufacturing asset to begin a second production task, thereby increasing the efficiency and cohesiveness of the overall production run. A manufacturing network may provide various other benefits as well.

In practice, manufacturing networks have certain characteristics that distinguish them from other types of data networks. As one example, manufacturing networks typically have a tree-like topology composed of nodes that are communicatively interlinked, where the nodes in the upper levels of the topology are typically networking devices (e.g., network switches, routers, repeaters, hubs, etc.) and nodes at the edge of the topology are typically programmable logic controllers ("PLCs"), computer numerical controllers ("CNCs"), drive systems, Human Machine Interfaces ("HMIs") or the like that are configured to control manufacturing assets or to allow humans to interact with the manufacturing assets. As another example, the topology of a manufacturing network typically remains fairly static once the network is established, whereas other types of data networks typically have topologies that change frequently (e.g., as wireless devices join and leave the network). Furthermore, given the harsh environment of a manufacturing plant, it is expected that much of the networking uses wired cables and the like due to poor wireless connectivity.

OVERVIEW

While the benefits of manufacturing networks are well known and numerous, typical manufacturing networks also have several drawbacks. For example, due to the complexity of the manufacturing network, determining the root cause of network problems may take network administrators a significant amount of time, which may result in costly downtime for the manufacturing network and the manufacturing assets communicatively linked by the manufacturing network. Additionally, a problem with a node in the manufacturing network is difficult to predict, and a given node may fail with little to no warning. Additionally yet, due to the tree-like topology of the manufacturing network, a problem with an upstream node may cause problems with a large number of downstream nodes. Again, such problems may lead to costly downtime of the manufacturing network and the corresponding manufacturing assets.

To address these issues, disclosed herein are techniques for monitoring the operation of a manufacturing network, identifying anomalies in the manufacturing network, and then reporting the identified anomalies. In accordance with the present disclosure, a data analytics platform may use data regarding the operation of the nodes in a manufacturing network to recursively determine a respective health score of each node in the manufacturing network. In this respect, the respective health score of any given node in the manufacturing network may be based on the operating data for both the given node itself, as well as the operating data for any child node to the given node. In turn, the data analytics platform may use the respective health scores of the nodes in the manufacturing network as a basis for identifying anomalous nodes in the manufacturing network. Once such anomalous nodes are identified, the data analytics platform may then cause a client station to present a report of the anomalous nodes to a user, which may then enable the user to identify and address the root cause the manufacturing network's anomalous operation.

Accordingly, in one aspect, disclosed herein is a method that involves (a) obtaining operating data for a manufacturing network that comprises a plurality of edge nodes, a plurality of intermediate nodes, and a root node; (b) based on the operating data, determining a respective critical state indicator for each node in at least a given segment of the manufacturing network; (c) based on the respective critical state indicator for each node in the given segment of the manufacturing network, recursively determining a respective health score for each node in the given segment of the manufacturing network, wherein (1) determining a respective health score for a given edge node in the manufacturing network is based on the respective critical state indicator for the given edge node, (2) determining a respective health score for a given intermediate node in the manufacturing network is based on the respective critical state indicator for the given intermediate node and the respective critical state indicator for each node that sits beneath the given intermediate node in the manufacturing network, and (3) determining a respective health score for the root node in the manufacturing network is based on the respective critical state indicator for the root node and the respective critical state indicator for each other node in the manufacturing network; (d) based on the respective health score for each node in the given segment of the manufacturing network, identifying one or more nodes in the given segment of the manufacturing network that are anomalous; and (e) causing a client station to present a report of the one or more nodes that are identified to be anomalous.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein.

In still another aspect, disclosed herein is a non-transitory computer-readable medium having instructions stored thereon that are executable to cause a computing system to carry out the functions disclosed herein.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
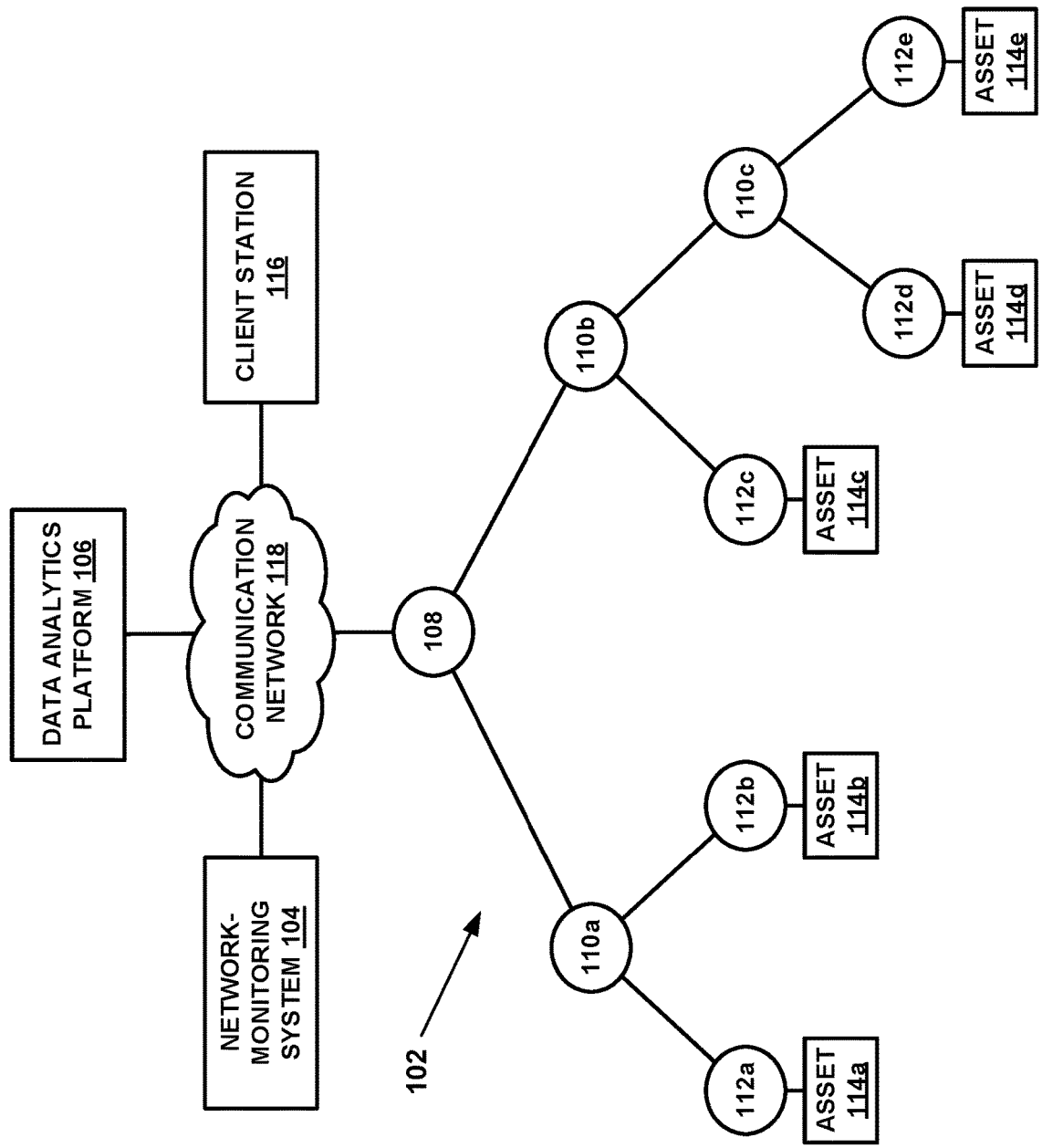
FIG. 1 depicts an example manufacturing network configuration in which example embodiments may be implemented.

Turning now to the figures, FIG. 1 depicts an example system 100 in which example embodiments may be implemented. As shown, the system 100 includes a manufacturing network 102, a network-monitoring system 104, and a data analytics platform 106, which may be communicatively coupled via a communication network 118. It should be understood that the system 100 may include various other entitles as well.

In general, the manufacturing network 102 may be a network of nodes that facilitates communication with and/or control of manufacturing assets in a manufacturing facility or the like. As shown in FIG. 1, the nodes in the manufacturing network 102 may be arranged in a tree-like topology, where the nodes at the edge of the topology (i.e., the "edge nodes") are generally configured to control the manufacturing assets and the other upstream nodes in the topology are generally configured to facilitate communication between and among the edge nodes and other computer systems and devices that are external to the manufacturing network 102.

In FIG. 1, the manufacturing network 102 is shown as including a root node 108, a plurality of intermediate nodes 110, such as intermediate nodes 110a, 110b, and 110c, and a plurality of edge nodes 112 that are coupled to respective manufacturing assets 114, such as edge node 112a coupled to manufacturing asset 114a, edge node 112b coupled to manufacturing asset 114b, edge node 112c coupled to manufacturing asset 114c, edge node 112d coupled to manufacturing asset 114d, and edge node 112e coupled to manufacturing asset 114e. However, there may be several variations to this manufacturing network configuration.

For example, while the manufacturing network 102 is shown as including a plurality of intermediate nodes 110, it is possible that a manufacturing network 102 may not include any intermediate nodes 110 (i.e., the root node 108 may be coupled directly to the edge nodes 112), or may possibly include only a single intermediate node 110 in some circumstances. As another example, while the root node 108 and the intermediate nodes 110 are each shown as being coupled to two downstream nodes (i.e., two intermediate nodes 110 and/or edge nodes 112), it should be understood that the root node 108 and each intermediate node 110 may be coupled to any number of downstream nodes. As yet another example, while the edge nodes 112 are described as being coupled to respective manufacturing assets 114, it should be understood that a manufacturing asset 114 may itself operate as an edge node 112, in which case an edge node 112 and its respective manufacturing asset 114 may effectively be integrated together into a single device. Other variations are possible as well.

In general, the root node 108 may be a networking device (e.g., a router, gateway, switch, hub, etc.) that sits at the top of the manufacturing network 102 and serves as the communication interface between the manufacturing network 102 and other computing systems devices, such as the networking-monitoring system 104, data analytics platform 106, and/or client station 116. In this respect, the root node 108 generally has no "parent" node and one or more "child" nodes in the manufacturing network 102. The root node 108 is discussed in further detail below with reference to FIG. 2.

In general, each intermediate node 110 may be a networking device (e.g., a router, gateway, switch, hub, etc.) that sits between the root node 108 and at least one edge node 112 and serves as a communication interface between the root node 108 and the at least one edge node 112. As shown, a given intermediate node 110 may either be coupled directly to the root node 108 (e.g., in the case of intermediate nodes 110a and 110b), or may be indirectly coupled to the root node 108 via one or more other intermediate nodes 110 that sits above the given intermediate node 110 (e.g., in the case of intermediate node 110c). Likewise, as shown, a given intermediate node 110 may either be coupled directly to an edge node 112, or may be indirectly coupled to an edge node 112 via one or more other intermediate nodes 110 (e.g., in the case of intermediate node 110b vis-à-vis edge nodes 112d and 112e). In this respect, each intermediate node 110 in the manufacturing network 102 generally has both a "parent" node (which may be the root node 108 or another intermediate node 110) and also one or more "child" nodes (which may comprise one or more other intermediate nodes 110 and/or one or more edge nodes 112). The intermediate nodes 110 are discussed in further detail below with reference to FIG. 2.

In general, each edge node 112 may be a device that sits at the bottom (or "edge") of the manufacturing network 102 that may be coupled with a corresponding manufacturing asset 114 (e.g., by performing sequential relay control, motion control, process control, etc.). In this respect, each edge node 112 in the manufacturing network 102 generally has a "parent" node (which may be the root node 108 or another intermediate node 110) but no "child" node. Such an edge node 112 may take various forms, an example of which comprises a programmable logic controller (PLC). The edge node 112 may also be a device not associated with a manufacturing asset 114, such as a personal computer, a server, a camera and such. The edge nodes 112 are discussed in further detail below with reference to FIG. 3.

In general, each manufacturing asset 114 may take the form of any device configured to perform one or more operations that are directly or indirectly associated with a manufacturing task. In this respect, the manufacturing assets 114 may each include one or more mechanical, electrical, electromechanical, and/or electronic components configured to perform such operations. For instance, the manufacturing assets may take the form of robotics devices and/or other types of assembly-line machines (e.g., stamping/forming machines, injection molding presses, pumps, conveyors, computer numerical control ("CNC") machines, printers, cutters, etc.). Manufacturing assets 114 may also encompass manufacturing infrastructure equipment such as conveyor systems, elevators, and automated guided vehicles. However, it should be understood that these are but a few examples of manufacturing assets and that numerous others are possible and contemplated herein. Such manufacturing assets may be located in the same physical location (e.g., a single manufacturing facility) or may be located in different physical locations (e.g., multiple manufacturing facilities).

While the edge nodes 112 are shown as being separate entities from their corresponding manufacturing assets 114, it should also be understood that an edge node 112 and a corresponding manufacturing asset 114 may be integrated together into a single physical entity (e.g., a given asset may have an embedded PLC). The edge nodes 112 and corresponding manufacturing assets 114 may be implemented in other manners as well.

As further shown in FIG. 1, each node in the manufacturing network 102 may be communicatively coupled to its parent node and/or one or more child nodes via a respective communication link. Such communication links may take various forms. As one possibility, the communication links between the nodes may take the form of wired links, such as Ethernet cables or the like. As another possibility, the communication links between the nodes may take the form of wireless links that are defined according to a wireless protocol, examples of which may include WiFi, Bluetooth, IrDA, ZigBee, among others. The communication links between the nodes may take other forms as well. It should also be understood that the communication links between the nodes may take different forms (e.g., some nodes may be coupled via wired links while other nodes may be coupled via wireless links).

Referring again to FIG. 1, the network-monitoring system 104 may generally take the form of one or more computer systems that are configured to monitor the operation of the manufacturing network 102 and capture data related to the operation of the manufacturing network 102, which may be referred to herein as network operating data. As examples, the network-monitoring system 104 could be a dedicated network-monitoring appliance or a general-purpose computer system (e.g., a server, personal computer, or the like) that is installed with software for monitoring a manufacturing network. The network-monitoring system 104 may reside physically within the manufacturing facility or it may reside at an external location. The network-monitoring system 104 could take other forms as well.

In practice, the network-monitoring system 104 may monitor various metrics related to the operation of the nodes in the manufacturing network 102. For instance, for each respective node in the manufacturing network 102 (or at least a subset of the nodes in the manufacturing network 102), the network-monitoring system 104 may capture data values for select operating metrics, such as a measure of transmission delays to and from the node in terms of delays in transmitting and receiving data and/or control packets, the extent of transmission loss for the node in terms of loss of data and/or control packets, the amount of bandwidth consumed by the node, the throughput and computer-resource utilization of the node, the extent of power failures and/or power interruptions at the node, etc. Further, in practice, the network-monitoring system 104 may capture the values for these operating metrics at various times (e.g., every few minutes according to a schedule). The network-monitoring system 104 may capture various other network operating data for the manufacturing network 102 as well.

While the network-monitoring system 104 is shown as being a separate entity from the nodes of the manufacturing network 102, it should be understood that one or more nodes of the manufacturing network (e.g., root node 108) may be configured to serve as the network-monitoring system 104 for the manufacturing network 102. The network-monitoring system 104 may be implemented in other manners as well.

In accordance with the present disclosure, the network-monitoring system 104 may also be configured to transmit network operating data for the manufacturing network 102 to the data analytics platform 106 for further analysis.

Broadly speaking, the data analytics platform 106 may take the form of one or more computer systems that are configured to receive, ingest, process, analyze, and/or provide access to data related to a manufacturing network, such as manufacturing network 102. For instance, the data analytics platform 106 may include one or more servers (or the like) having hardware components and software components that are configured to carry out one or more of the functions disclosed herein for receiving, ingesting, processing, analyzing, and/or providing access to network operating data. In practice, the data analytics platform 106 may be located in a single physical location or distributed amongst a plurality of locations, and may be communicatively linked via a system bus, a communication network, or some other connection mechanism.

In one particular implementation, the data analytics platform 106 may comprise the computing infrastructure of an Internet Area Network (IAN) such as a public, private, or hybrid cloud. In another implementation, the data analytics platform 106 may comprise one or more dedicated servers, which may be located either at a different location from the manufacturing network 102 or at the same general location as the manufacturing network 102 (e.g., at a manufacturing facility). The data analytics platform 106 may take various other forms as well, and is discussed in further detail below with reference to FIGS. 4-5.

Referring again to FIG. 1, the communication network 118 may generally include one or more computing systems, network infrastructure, and/or communication links that are configured to facilitate transferring data between the manufacturing network 102, the network-monitoring system 104, and/or the data analytics platform 106. The communication network 104 may comprise one or more Local-Area Networks (LANs) and/or Wide-Area Networks (WANs), which may be wired and/or wireless and may support secure communication. In some examples, the communication network 118 may include one or more cellular networks and/or the Internet, among other networks. The communication network 118 may operate according to one or more communication protocols, such as LTE, CDMA, GSM, LPWAN, WiFi, Bluetooth, Ethernet, HTTP/S, TCP, CoAP/DTLS and the like.

Although the communication network 118 is shown as a single network, it should also be understood that the communication network 118 may include multiple, distinct networks that are themselves communicatively linked. For example, the communication network 118 may include a first communication network (e.g., a LAN) that communicatively couples the manufacturing network 102 to the network-monitoring system 104 and then a second communication network (e.g., the Internet) that communicatively couples the manufacturing network 102 and/or the network-monitoring system 104 to the data analytics platform 106. Further, in some embodiments, the manufacturing network 102, the network-monitoring system 104, and/or the data analytics platform 106 may be coupled with one another via a single communication link, such as an Ethernet cable or a wireless point-to-point link for instance. The communication network 118 could take other forms as well.

Further, although not shown, the communication path between the manufacturing network 102, the network-monitoring system 104, and/or the data analytics platform 106 may include one or more intermediate devices. Many other configurations are also possible.

As further shown in FIG. 1, the system 100 may also include a client station 116 that is communicatively coupled to the manufacturing network 102, the network-monitoring system 104, and/or the data analytics platform 106 via the communication network 118. The client station 116 may take the form of any computing system and/or device that enables a user to interact with the manufacturing network 102, the network-monitoring system 104, and/or the data analytics platform 106. To facilitate this, the client station 116 may include hardware components such as a user interface, a network interface, a processor, and data storage, among other components. Additionally, the client station 116 may be configured with software components that enable interaction with the manufacturing network 102, the network-monitoring system 104, and/or the data analytics platform 106 via a graphical user interface or the like, such as a web browser that is capable of accessing a web application provided by the manufacturing network 102, the network-monitoring system 104, and/or the data analytics platform 106 or a native client application associated with the manufacturing network 102, the network-monitoring system 104, and/or the data analytics platform 106, among other examples. Representative examples of client stations may include a desktop computer, a laptop, a netbook, a tablet, a smartphone, a personal digital assistant (PDA), or any other such device now known or later developed.

II. EXAMPLE NETWORKING DEVICE

Figure 2:
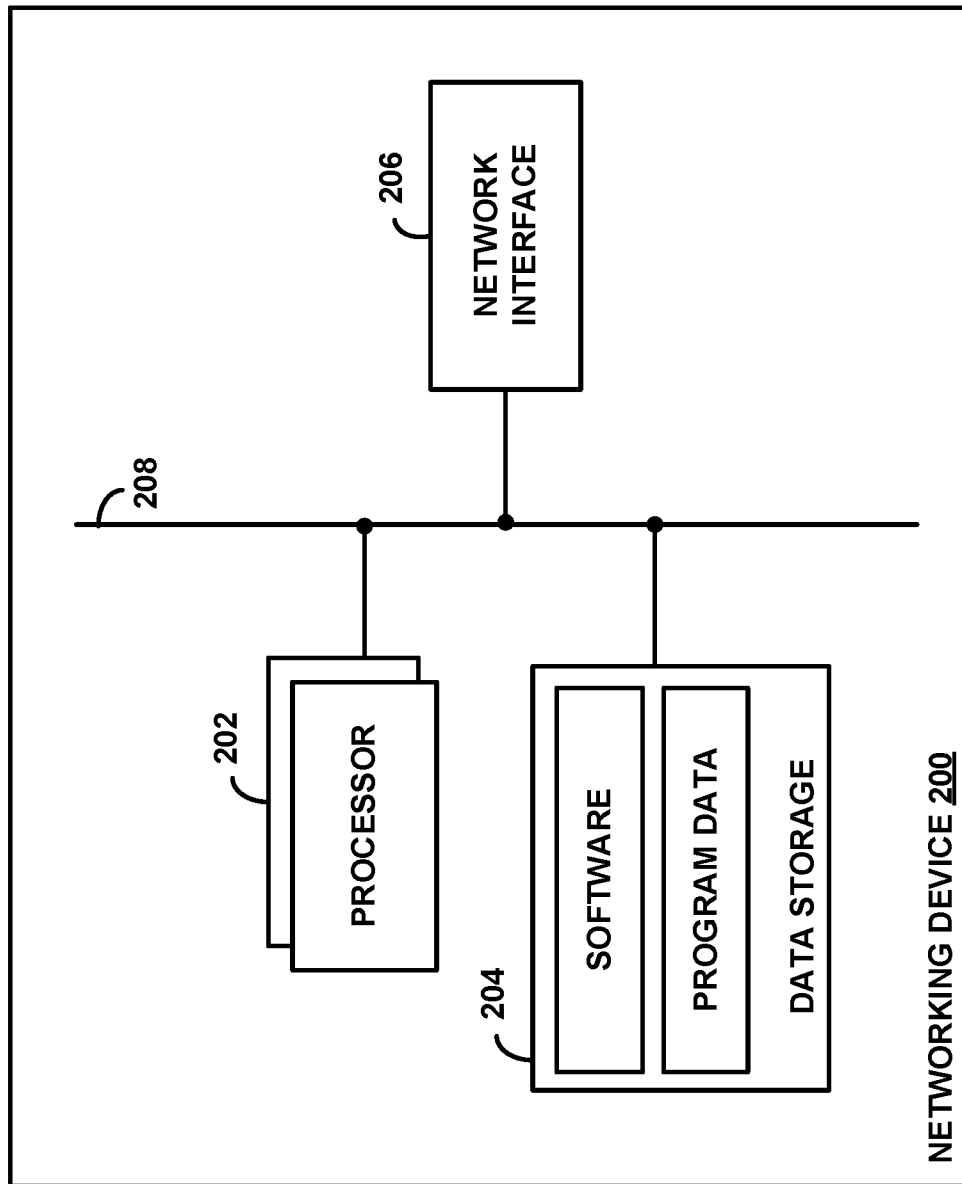
FIG. 2 depicts a simplified block diagram of an example root node or intermediate node.

FIG. 2 is a simplified block diagram illustrating some components that may be included in an example networking device 200 (e.g., a router, gateway, switch, hub, etc.) that is capable of serving as a root node or intermediate node of a manufacturing network, such as root node 108 or one of the intermediate nodes 110 of the manufacturing network 102. As shown, the example networking device 200 may include one or more processors 202, data storage 204, and a network interface 206, all of which may be communicatively linked by a communication link 208 that may take the form of a system bus, communication network, or some other connection mechanism. One of ordinary skill in the art will appreciate that the networking device 200 may also include additional components that are not shown and/or more or less of the depicted components.

The processor 202 may include one or more processors and/or controllers, which may take the form of a general- or special-purpose processor or controller. In particular, in example implementations, the processor 202 may be or include microprocessors, microcontrollers, application specific integrated circuits, digital signal processors, and the like. In turn, the data storage 204 may be or include one or more non-transitory computer-readable storage media, such as optical, magnetic, organic, or flash memory, among other examples. As shown, the data storage 204 may contain software and/or program data, among other examples.

The network interface 206 may be configured to facilitate wireless and/or wired communication between the networking device 200 and various other networked-enabled devices and systems, such as other nodes in a manufacturing network and/or the data analytics platform 106. As such, network interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Other examples are possible as well. In practice, the network interface 206 may be configured according to a communication protocol, such as but not limited to any of those described above. Network interface 206 may also include multiple network interfaces that support various different types of network connections.

One of ordinary skill in the art will appreciate that the networking device 200 shown in FIG. 2 is but one example of a simplified representation of a networking device, and that numerous other examples are also possible.

III. EXAMPLE EDGE NODE

Figure 3:
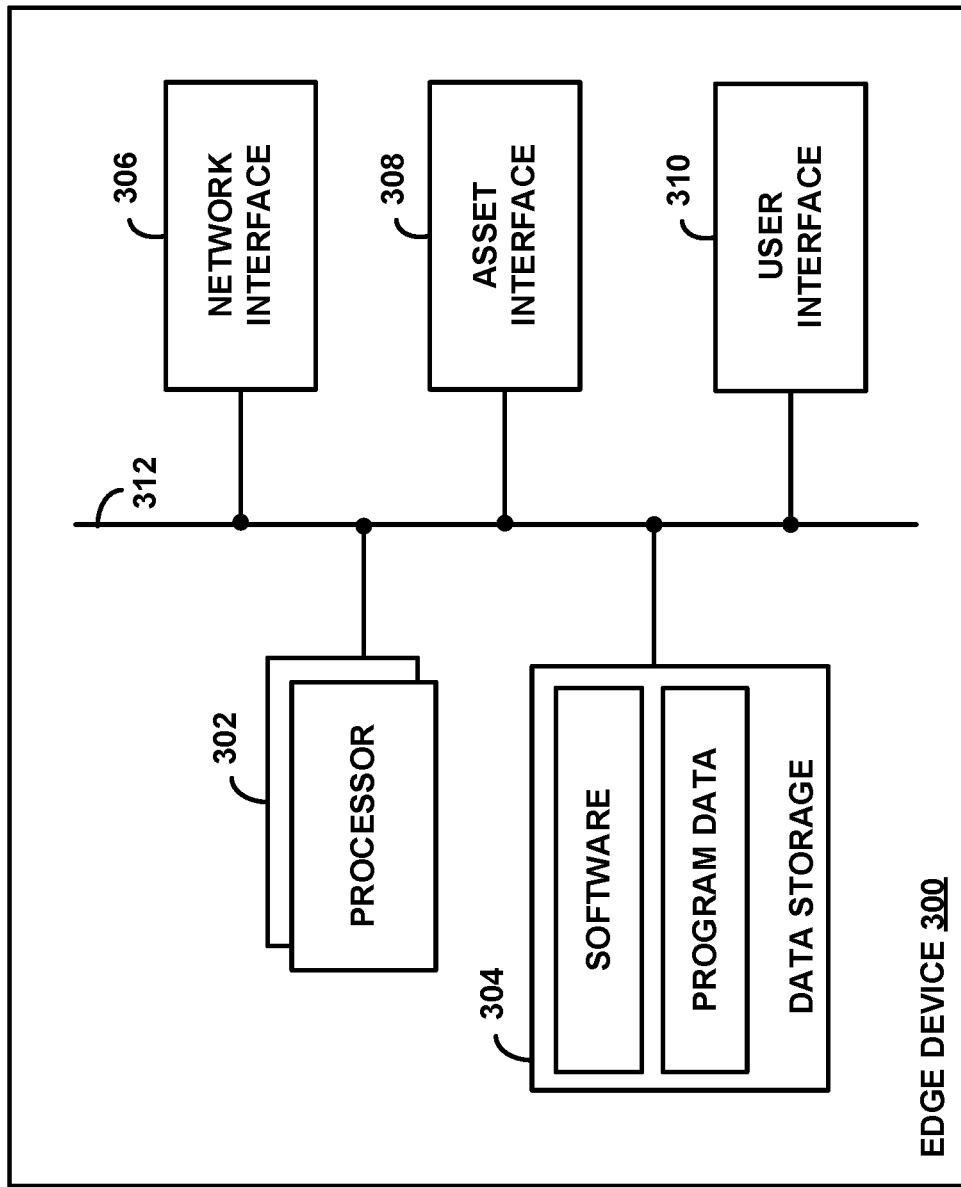
FIG. 3 depicts a simplified block diagram of an example edge node.

FIG. 3 is a simplified block diagram illustrating some components that may be included in an example device 300 that is capable of serving as an edge node of a manufacturing network, such as one of the edge nodes 112 of the manufacturing network 102. As shown, the example device 300 may include one or more processors 302, data storage 304, network interface 306, asset interface 308, and also potentially a user interface 310, all of which may be communicatively linked by a communication link 312 that may take the form of a system bus, communication network, or some other connection mechanism. One of ordinary skill in the art will appreciate that the networking device 200 may also include additional components that are not shown and/or more or less of the depicted components.

The processor 302 may include one or more processors and/or controllers, which may take the form of a general- or special-purpose processor or controller. In particular, in example implementations, the processor 302 may be or include microprocessors, microcontrollers, application specific integrated circuits, digital signal processors, and the like. In turn, the data storage 304 may be or include one or more non-transitory computer-readable storage media, such as optical, magnetic, organic, or flash memory, among other examples. As shown, the data storage 304 may contain software and/or program data, among other examples.

The network interface 306 may be configured to facilitate wireless and/or wired communication between the device 300 and various other networked-enabled devices and systems, such as other nodes in a manufacturing network and/or the data analytics platform 106. As such, the network interface 306 may take any suitable form for carrying out this function, examples of which may include an Ethernet interface, a serial bus interface (e.g., Firewire, USB 2.0, etc.), a chipset and antenna adapted to facilitate wireless communication, and/or any other interface that provides for wired and/or wireless communication. Other examples are possible as well. In practice, the network interface 306 may be configured according to a given communication protocol, such as one of the protocols discussed above and/or a manufacturer-specific protocol. Network interface 306 may also include multiple network interfaces that support various different types of network connections.

The asset interface 308 may be configured to facilitate wireless and/or wired communication between the device 300 and an asset, such as one of the manufacturing assets 114 in manufacturing network 102, thereby enabling the device 300 to communication with and control a manufacturing asset. The asset interface 308 may take any suitable form for carrying out this function, examples of which may include an Ethernet interface, a serial bus interface (e.g., Firewire, USB 2.0, RS-232, RS-485, RS-422, etc.), a chipset and antenna adapted to facilitate wireless communication with an asset, and/or any other interface that provides for wired and/or wireless communication with an asset. Other examples are possible as well. In practice, the asset interface 308 may be configured according to a given communication protocol, such as one of the protocols discussed above and/or a manufacturer-specific protocol. Asset interface 308 may also include multiple asset interfaces that support various different types of asset connections. It should be understood that if the device 300 is a device not associated with a manufacturing asset 114 (such as a personal computer, a server, a camera and such), the device 300 may not include an asset interface 308.

As discussed above, the device 300 may also optionally include a user interface 310, which may be configured to facilitate interaction with a user. Such a user interface 310 may take any suitable form for carrying out this function, examples of which may include a touch-sensitive interface, mechanical interfaces (e.g., levers, buttons, wheels, dials, keyboards, etc.), a display screen, speakers, a headphone jack, and the like. In other implementations, a user may interact with the device 300 via a client station that is communicatively coupled to the device 300 via the network interface 306. Other implementations are possible as well.

One of ordinary skill in the art will appreciate that the edge device 300 shown in FIG. 3 is but one example of a simplified representation of a networking device, and that numerous other examples are also possible.

IV. EXAMPLE PLATFORM

Figure 4:
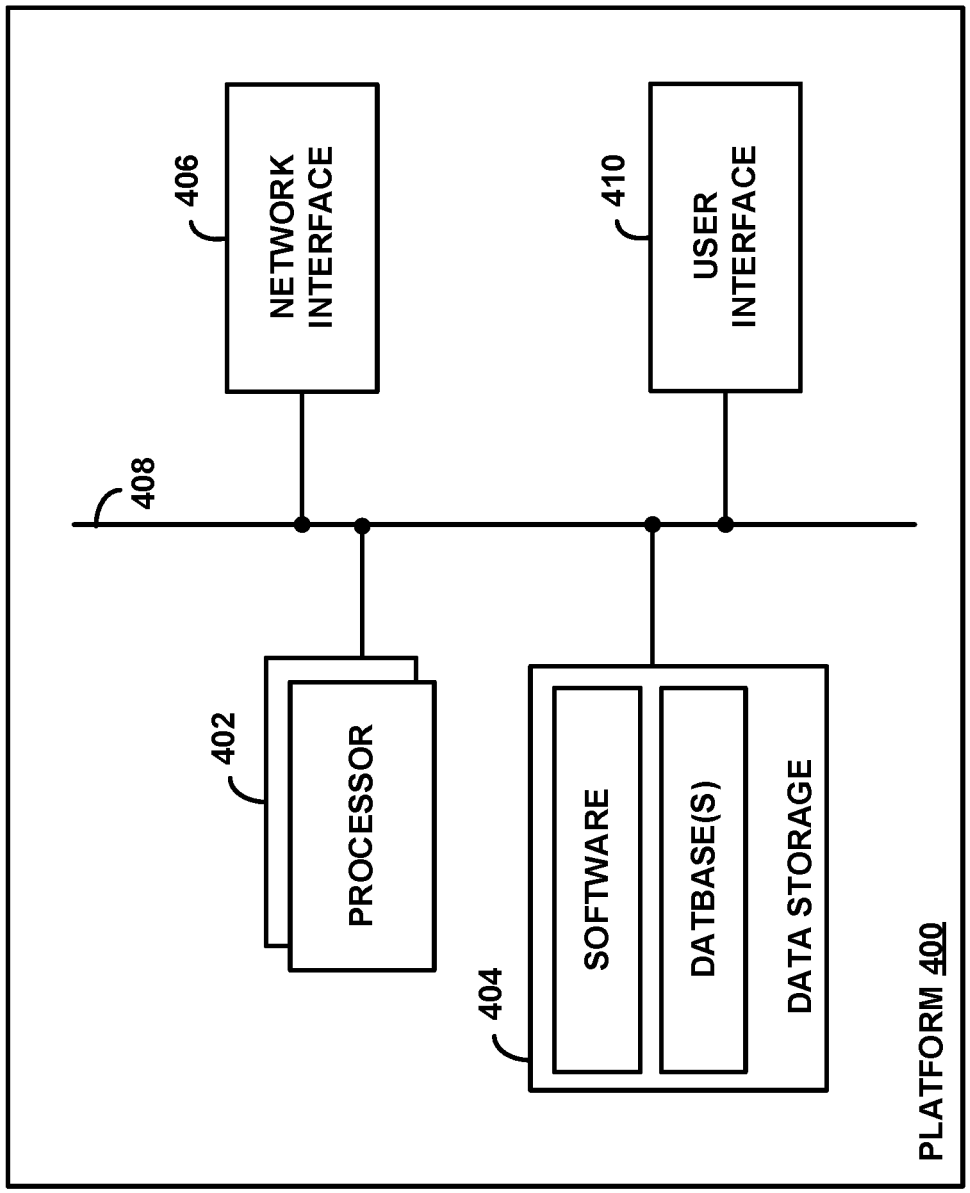
FIG. 4 depicts a structural diagram of an example platform.

FIG. 4 is a simplified block diagram illustrating some components that may be included in an example data analytics platform 106 from a structural perspective. In line with the discussion above, the data analytics platform 106 may generally comprise one or more computer systems (e.g., one or more servers), and these one or more computer systems may collectively include one or more processors 402, data storage 404, network interface 406, and perhaps also a user interface 410, all of which may be communicatively linked by a communication link 408 such as a system bus, network, or other connection mechanism.

The processor 402 may comprise one or more processors and/or controllers, which may take the form of a general- or special-purpose processors or controllers. In particular, in example implementations, the processor 402 may include microprocessors, microcontrollers, application-specific integrated circuits, digital signal processors, or the like. There may be multiple processors that are distributed over multiple locations.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown, the data storage 404 may be provisioned with software components that enable the data analytics platform 106 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for polyglot storage. In addition, the data storage may be distributed over multiple physical locations.

The network interface 406 may be configured to facilitate wireless and/or wired communication between the data analytics platform 106 and various network components via the communication network 112, such as root nodes 106, intermediate nodes 110, and edge nodes 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as WL, and Base64. Other configurations are possible as well.

The example data analytics platform 106 may also support a user interface 410 that is configured to facilitate user interaction with the data analytics platform 106 and may also be configured to facilitate causing the data analytics platform 106 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
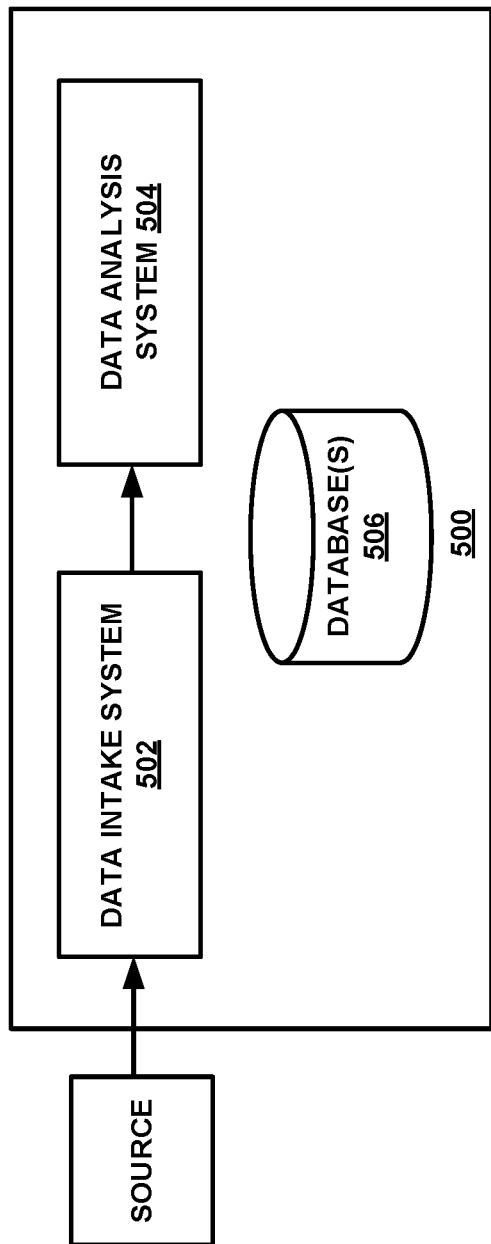
FIG. 5 is a functional block diagram of an example platform.

Referring now to FIG. 5, another simplified block diagram is provided to illustrate some components that may be included in an example data analytics platform 106 from a functional perspective. For instance, as shown, the example data analytics platform 106 may include a data intake system 502 and a data analysis system 504, each of which comprises a combination of hardware and software that is configured to carry out particular functions. The data analytics platform 106 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive data related to a manufacturing network, such as network operating data, and then provide at least a portion of the received data to the data analysis system 504. In this respect, the data intake system 502 may be configured to receive data related to a manufacturing network from various sources, examples of which may include the manufacturing network itself, a network-monitoring system, or some other intermediate device. In practice, the data received by the data intake system 502 may take the form of data packets that are transmitted over a communication network, but the data could take other forms as well. Further, in some examples, the data intake system 502 may be configured according to a given dataflow technology, such as a NiFi receiver or the like.

The data intake system 502 may also be configured to perform various pre-processing functions on the data that it receives, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping any unreliable data. As yet another example, the data intake system 502 may "de-duplicate" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

The data intake system 502 may further be configured to store the received data in one or more of the databases 506 for later retrieval. For example, the data intake system 502 may store the raw data received from a given source (e.g., the network-monitoring system 104) and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for polyglot storage. For example, the data intake system 502 may store the payload of received data in a first type of database (e.g., a time-series or document database) and may store the associated metadata of received data in a second type of database that permit more rapid searching (e.g., a relational database). In such an example, the metadata may then be linked or associated to the data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing node attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

V. EXAMPLE OPERATIONS

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As discussed above, disclosed herein are improved processes, systems, and devices for monitoring the operation of manufacturing networks, identifying anomalies in the manufacturing network, and then reporting the identified anomalies in a manner that enables an individual responsible for overseeing the manufacturing network to address such anomalies in a more efficient manner. In accordance with the present disclosure, a data analytics system may generally be configured to (1) determine a respective "health score" for each node in the manufacturing network (or at least a subset of the nodes the manufacturing network), which is a measure of the operating health of a node in a manufacturing network, (2) use the determined health scores as a basis for identifying nodes in the manufacturing network that appear to be anomalous, and then (3) cause a report of the anomalous nodes to be presented to an individual responsible for overseeing the manufacturing network, such as a network administrator or the like.

An example of the disclosed process for monitoring the operation of a manufacturing network, identifying anomalies in the manufacturing network, and then reporting the identified anomalies will now be described with reference to FIG. 6. For the purposes of illustration, the example functions are described as being carried out by the data analytics platform 106 illustrated in FIG. 1. However, it should be understood that computing systems or devices other than the data analytics platform 106 may perform the example functions. Likewise, it should be understood that the flow diagram in FIG. 6 is provided for sake of clarity and explanation and that numerous other combinations of functions may be utilized to monitor the operation of nodes in a manufacturing network and identify anomalous nodes—including the possibility that example functions may be added, removed, rearranged into different orders, combined into fewer blocks, and/or separated into additional blocks depending upon the particular embodiment.

Figure 6:
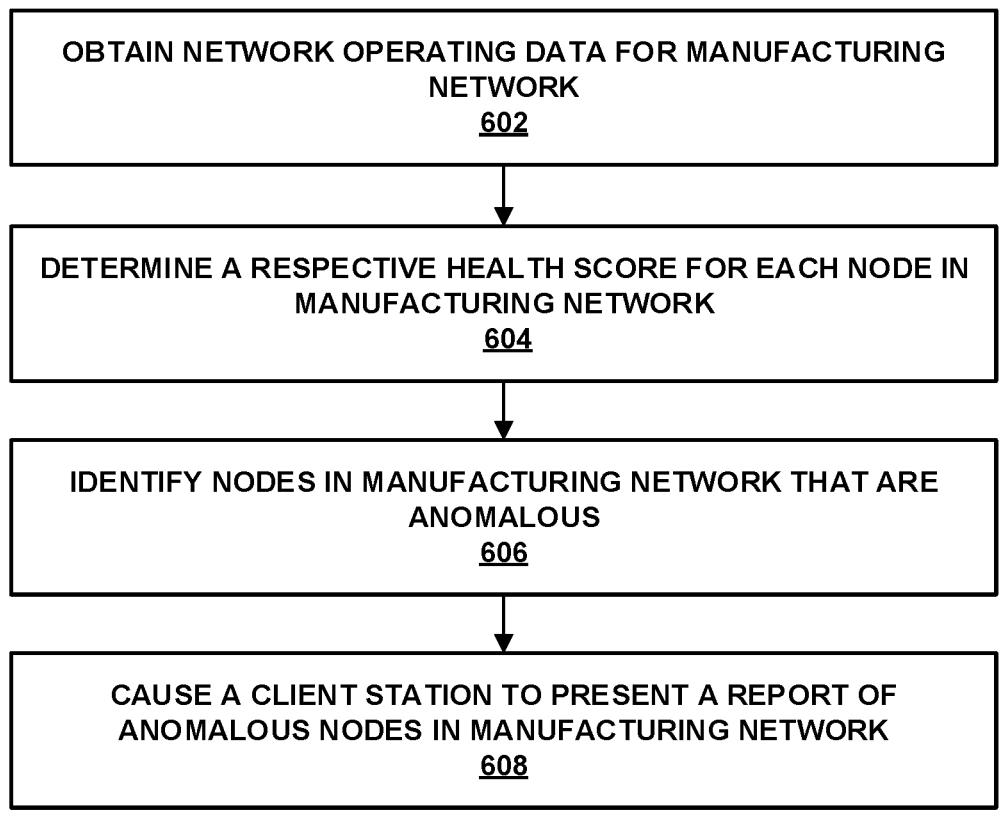
FIG. 6 is a flow diagram of example functions associated with monitoring the operation of a manufacturing network, identifying anomalies in the manufacturing network, and then reporting the identified anomalies.

At block 602 of FIG. 6, the data analytics platform 106 may obtain network operating data for the manufacturing network 102. This network operating data may take various forms, examples of which may include analog signals, data streams, and/or network packets. Further, the data analytics platform 106 may obtain the network operating data in various manners. As one example, the network-monitoring system 104 could be configured to send (i.e., "push") network operating data to the data analytics platform 106 at various times, such as according to a schedule or in response to a triggering event (e.g., detecting some sort of precondition for sending data to the data analytics platform 106). As another example, the data analytics platform 106 may request network operating data from the network-monitoring system 104 at various times, such as according to a schedule or in response to a triggering event (e.g., detecting some sort of precondition for sending network operating data to the data analytics platform 106), and the network-monitoring system 104 may send network operating data in response to such requests. As yet another example, the data analytics platform 106 may send and/or request network operating data from an intermediate entity that aggregates network operating data for various different manufacturing networks. Other examples are also possible.

At block 604 of FIG. 6, the data analytics platform 106 may determine a respective health score for each of node in the manufacturing network 102 (or at least a subset of the nodes in the manufacturing network 102). The data analytics platform 106 may make this determination at various times. For example, the data analytics platform 106 may make this determination periodically (e.g., at predefined time intervals), such as according to a schedule. In another example, the data analytics platform 106 may determine make this determination when prompted (e.g., by a user) or in response to a triggering event. The data analytics platform 106 may determine the respective health score for a node at other times as well.

Further, the process for determining the respective health scores of the nodes in the manufacturing network 102 may take various forms. One possible implementation of the process for determining the respective health scores of the nodes in the manufacturing network 102 will now be described with reference to FIG. 7. For the purposes of illustration, the example functions are again described as being carried out by the data analytics platform 106 illustrated in FIG. 1. However, it should be understood that computing systems or devices other than the data analytics platform 106 may perform the example functions. Likewise, it should be understood that the flow diagram in FIG. 7 is provided for sake of clarity and explanation and that numerous other combinations of functions may be utilized to determine the respective health scores of nodes in a manufacturing network—including the possibility that example functions may be added, removed, rearranged into different orders, combined into fewer blocks, and/or separated into additional blocks depending upon the particular embodiment.

Figure 7:
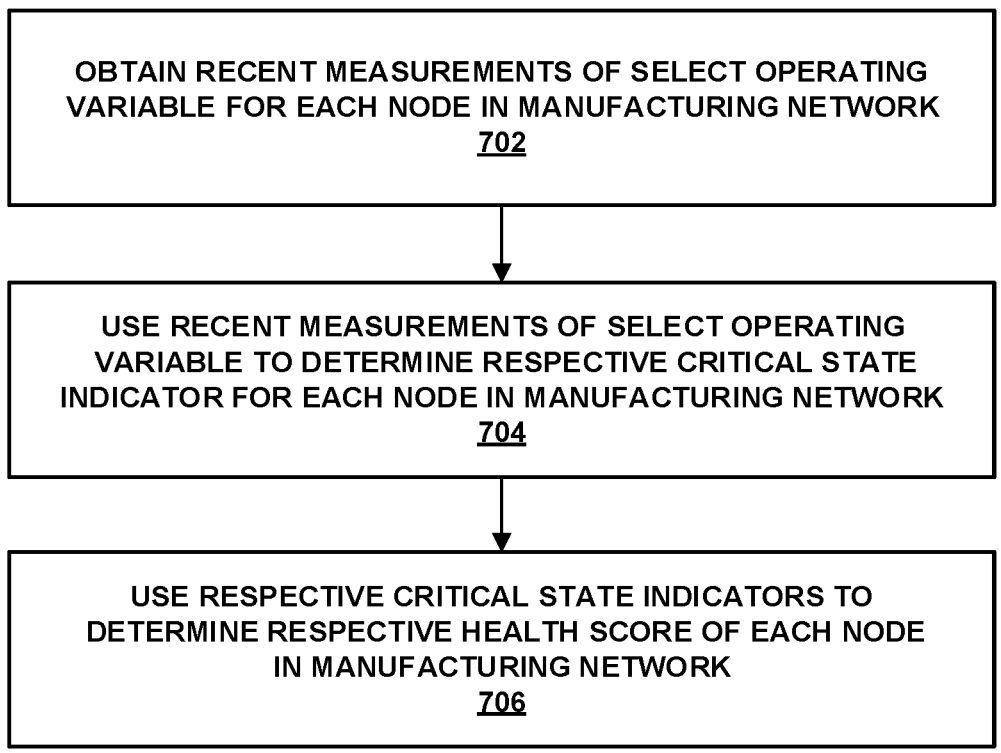
FIG. 7 is a flow diagram of one possible implementation of a process for determining respective health scores for nodes in a manufacturing network in accordance with the present disclosure.

As shown in block 702 of FIG. 7, the data analytics platform 106 may begin by obtaining recent measurements of at least one select operating metric for each node in the manufacturing network 102 (or at least a subset of the nodes in the manufacturing network 102), such as measurements of the select operating metric that were captured for the given node over a recent period of time in the past (e.g., the past few hours, days, etc.). For instance, the data analytics platform 106 may access recent measurements of the amount of transmission delays to and from each node in the manufacturing network 102, the extent of transmission losses to and from each node in the manufacturing network 102, the bandwidth consumed by each node in the manufacturing network 102, the throughput of each node in the manufacturing network 102, and/or the computer-resource utilization of each node in the manufacturing network 102, among other examples. In practice, the data analytics platform 106 may obtain such measurements in various manners, examples of which may include accessing such measurements from a database and/or requesting and receiving such measurements from the network-monitoring system 104, among other possibilities.

At block 704, the data analytics platform 106 may then use the recent measurements of the at least one select operating metric to determine a respective "critical state indicator" for each node in the manufacturing network 102 (or at least a subset of the nodes in the manufacturing network 102), which is an indicator of the likelihood that a node is operating abnormally. This critical state indicator may take various forms, examples of which may include a binary indicator (e.g., a value of "0" or "1") or a probability value (e.g., a value ranging from 0 to 1). Further, the data analytics platform 106 may use the recent measurements of the at least one select operating metric to determine a respective critical state indicator for each node of the manufacturing network 102 in various manners.

In one implementation, the data analytics platform 106 may determine a respective critical state indicator for a given node by comparing the given node's most-recent one or more measurements of the select operating metric (e.g., the transmission delay time for the node, the extent of transmission losses to and from the node, the amount of bandwidth consumed by the node, the computer-resource utilization of the node, the extent of power failures and/or power interruptions at the node, etc.) to threshold criteria that defines whether the most-recent one or more measurements are considered to be abnormal. Based on this comparison, the data analytics platform 106 may (1) set the critical state indicator to a value of "1" if the given node's most-recent one or more measurements of the select operating metric satisfy the threshold criteria (e.g., if the most-recent measurement of the select operating metric falls above or below a threshold value) and (2) set the critical state indicator to a value of "0" if the given node's most-recent one or more measurements of the select operating metric do not satisfy the threshold criteria. In this respect, the threshold criteria may take various forms. As one example, the threshold criteria may be a fixed value that is specific to the select operating metric. As another example, the threshold criteria may be defined based on past measurements of the select operating metric for the given node. The threshold criteria may take other forms as well.

In an implementation where threshold criteria is defined based on past measurements of the select operating metric for the given node, such threshold criteria may be defined in various manners. As one possibility, the data analytics platform 106 may define the threshold criteria for a given node applying an outlier detection technique such as a threshold that is calculated as a value that is beyond a multiple of interquartile range (IQR) from the third quartile measurement of a set of historical values of the given operating metric.

Such an IQR rule may cause the data analytics platform 106 to (1) determine a statistical dispersion between the seventy-fifth and twenty-fifth percentiles of the set of measurements, (2) subtract the first quartile of the set of measurements from the third quartile of the set of measurements, which defines the IQR for the set of measurements, (3) multiply the IQR by a desired factor (e.g., 1.5), and (4) add the resulting value to the third quartile of the set of measurements, which defines a maximum threshold for the set of measurements. In turn, the data analytics platform 106 may compare the given node's most-recent measurement of the select operating metric to this maximum threshold and then either (1) set the critical state indicator for the given node to a value of "1" if the given node's most-recent measurement of the select operating metric exceeds this maximum threshold or (2) set the critical state indicator for the given node to a value of "0" if the given node's most-recent measurement of the select operating metric does not exceed this maximum threshold.

Instead of comparing just the most-recent measurement of the select operating metric for the given node to the maximum threshold defined based on the IQR rule, the data analytics 106 may alternatively compare multiple recent measurements of the select operating metric for the given node to the maximum threshold defined based on the IQR rule. For instance, the data analytics 106 may first aggregate two or more recent measurements of the select operating metric for the given node (e.g., by taking the mean, median, mode, maximum, minimum, etc. of the two or more recent measurements), and may then compare the aggregated value to the maximum threshold defined based on the IQR rule.

The function of determining a respective critical state indicator for a given node in the manufacturing network 102 may take other forms as well. For instance, as noted above, the data analytics system 106 may set the critical state indicator for the given node to a probability value, rather than a binary indicator. In this respect, as one possible example, the data analytics system 106 may assign a critical state probability value to a given node based on how the most-recent one or more measurements of the select operating metric for the given node compares to the threshold criteria. In such an approach, a most-recent measurement of the select operating metric that is not close to satisfying the threshold criteria may result in a critical state probability value closer to 0, whereas a most-recent measurement of the select operating metric that goes well beyond the threshold criteria may result in a critical state probability value closer to 1.

Further, as noted above, the respective critical state indicator for each node may also be determined based on recent measurements for multiple operating metrics, rather than a single operating metric. For example, the data analytics system 106 may determine a respective critical state indicator for a given node by comparing the given node's most-recent measurement of each of multiple operating metrics to respective threshold criteria for such operating metrics.

Further yet, it is possible that the respective critical state indicator for a given node may be determined based on the recent measurements of an operating metric for both the given node and one or more other nodes in the manufacturing network 102 (e.g., child, sibling, or parent nodes). Other variations of the function of determining a respective critical state indicator for a given node in the manufacturing network 102 may exist as well.

At block 706, the data analytics platform 106 may use the respective critical state indicators of the nodes in the manufacturing network to determine the respective health scores for the nodes in the manufacturing network 102. In this respect, the data analytics platform 106 may determine the respective health scores for the nodes in the manufacturing network 102 in a recursive manner, where the data analytics platform 106 begins by determining the respective health scores for the edge nodes in the manufacturing network 102 and then moves up the manufacturing network's topology level-by-level until the data analytics platform 106 reaches the root node 108.

According to one implementation, the data analytics platform 106 may begin this recursive process by determining the respective health score for each edge node 112 in the manufacturing network 102 based solely on the respective critical state indicator for the edge node 112. In this respect, as one possible example, the data analytics platform 106 may take the complement of the given node's critical state indicator and set the resulting value as the respective health score for the given node. This determination may be represented by the following equation:

$$HS_E = 1 - CS_E \qquad (1)$$

In this equation, $HS_E$ is the respective health score for a given edge node E and $CS_E$ is the respective critical state indicator for the given edge node E. Thus, if the respective critical state indicator for a given node is a value of 1, the respective health score for the given node will be a value of 0, and vice versa. The data analytics platform 106 may determine a given edge node's health score based on the given node's critical state indicator in other manners as well.

In turn, the data analytics platform 106 may then proceed up the manufacturing network's topology from the edge nodes 112 to the root node 108 and recursively determine the respective health score for each intermediate node 110 in the manufacturing network 102 based on the respective critical state indicator for the intermediate node 110 itself as well as the critical state indicator for each node that sits beneath the intermediate node 110 in the manufacturing network 102 (e.g., any child node, grandchild node, greatgrandchild node, etc. of the given node). The data analytics platform 106 may carry out this function in various manners.

As one possibility, the data analytics platform 106 may start with each intermediate node 110 in the manufacturing network 102 that is one level above the edge nodes 112 in the manufacturing network 102, which would be intermediate nodes 110a and 110c in the particular manufacturing network arrangement depicted in FIG. 1. The data analytics platform 106 may then determine the respective health score for each such intermediate node 110 by (1) taking the complement of the respective critical state indicator for the intermediate node itself and thereby determining a "standalone" health score for the given intermediate node 110, (2) applying an aggregation function to a set of values that includes the standalone health score for the intermediate node itself and the respective health score for each edge node 112 that is a child of the intermediate node 110 (e.g., edge nodes 112a and 112b for intermediate node 110a and edge nodes 112d and 112e for intermediate node 110c). This determination may be represented by the following equation:

$$HS_I = F[(1-CS_I)U(HS_{CHILDREN})] \qquad (2)$$

In this equation, $HS_I$ is the respective health score for a given intermediate node I, $CS_I$ is the respective critical state indicator for the given intermediate node I, $(1-CS_I)$ is the standalone health score for the given intermediate node I, $HS_{CHILDREN}$ is the set of one or more respective health scores for the given intermediate node's one or more child nodes, and F is an aggregation function that is used to aggregate the set of values that includes the standalone health score for the given intermediate node I and the respective health score for each child node of the given intermediate node I. Such an aggregation function may take various forms, examples of which may include a function that determines a mean, median, mode, maximum, minimum, etc. of the set of values that includes the standalone health score for given intermediate node I and the respective health score for each child node of the given intermediate node I.

The data analytics platform 106 may determine the respective health score for each intermediate node that is one level above the edge nodes 112 in the manufacturing network 102 in other manners as well.

In a similar manner, the data analytics platform 106 may then determine a respective health score for any intermediate node 110 at the next-higher level of the manufacturing network's topology, which would be intermediate node 110b in the particular manufacturing network arrangement depicted in FIG. 1. For instance, the data analytics platform 106 may determine the respective health score for intermediate node 110b by (1) taking the complement of the respective critical state indicator for the intermediate node itself and thereby determining a "standalone" health score for the intermediate node 110b, (2) applying an aggregation function to a set of values that includes the standalone health score for the intermediate node itself and the respective health score for each child node of the intermediate node 110b, which is edge node 112c and intermediate node 110c in the particular manufacturing network arrangement depicted in FIG. 1. This determination may likewise be represented by Equation 2 shown above.

The data analytics platform 106 may continue up the manufacturing network's topology in this manner until it has determined the respective health score for each intermediate node 110 in the manufacturing network 102. At that point, the data analytics platform 106 may then determine the respective health score for the root node 108 of the manufacturing network 102 by (1) taking the complement of the respective critical state indicator for the root node itself and thereby determining a "standalone" health score for the root node 108, (2) applying an aggregation function to a set of values that includes the standalone health score for the root node itself and the respective health score for each child node of the root node 108, which is intermediate nodes 110a and 110b in the particular manufacturing network arrangement depicted in FIG. 1. This determination may be represented by the following equation, which is similar to Equation 2 discussed above:

$$HS_R = F[(1-CS_R)U(HS_{CHILDREN})] \qquad (3)$$

In this equation, $HS_R$ is the respective health score for the root node R, $CS_R$ is the respective critical state indicator for the root node R, $(1-CS_R)$ is the standalone health score for the root node R, $HS_{CHILDREN}$ is the set of one or more respective health scores for the root node's one or more child nodes, and F is an aggregation function that is used to aggregate the set of values that includes the standalone health score for the root node R and the respective health score for each child node of the root node R. As above, such an aggregation function may take various forms, examples of which may include a function that determines a mean, median, mode, maximum, minimum, etc. of the set of values that includes the standalone health score for the root node R and the respective health score for each child node of the root node R.

Figure 8:
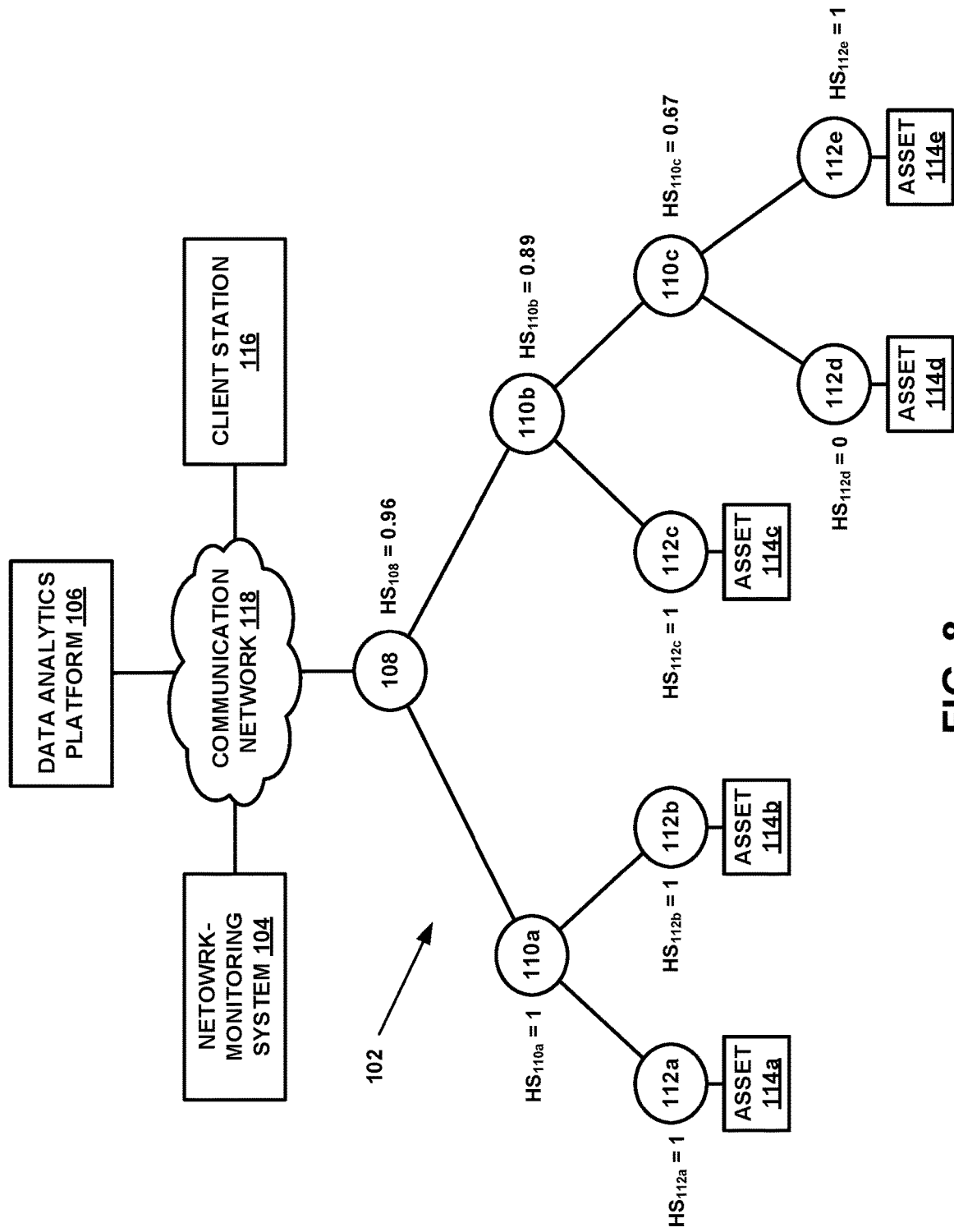
FIG. 8 illustrates possible examples of health scores that may be determined for the nodes in the manufacturing network configuration depicted in FIG. 1.

To help further illustrate this recursive process, a specific example for determining the respective health scores of nodes in a manufacturing network will now be described with reference to FIG. 8, which shows possible examples of health scores that may be determined for the nodes manufacturing network 102 of FIG. 1. For purposes of this example, it will be assumed that the aggregation function used to determine the respective health scores of the intermediate nodes 110 and the root node is a function that calculates the mean of the underlying health score values.

In line with the discussion above, the data analytics platform 106 may first determine the respective health scores for each of edge nodes 112a-112e. In this respect, assume that the data analytics platform 106 determines edge node 112a to have a respective health score $HS_{112a}=1$, edge node 112b to have a respective health score $HS_{112b}=1$, edge node 112c to have a respective health score $HS_{112c}=1$, edge node 112d to have a respective health score $HS_{112d}=0$, and edge node 112e to have a respective health score $HS_{112e}=1$.

Moving to the next level of the manufacturing network's topology, the data analytics platform 106 may then determine the respective health scores for each of intermediate nodes 110a and 110c. Assuming that both intermediate nodes 110a and 110c have standalone health scores of 1 (i.e., critical state indicators of 0), the data analytics platform 106 may determine intermediate node 110a to have a respective health score $HS_{110a}=1$ and may determine intermediate node 110c to have a respective health score $HS_{110c}=0.67$.

Again moving up the manufacturing network's topology, the data analytics platform 106 may determine the respective health score for intermediate node 110b. Assuming that intermediate node 110b has a standalone health score of 1, the data analytics platform 106 may determine intermediate node 110b to have a respective health score $HS_{110b}=0.89$.

Lastly, the data analytics platform 106 may determine the respective health score for root node 108. Assuming that root node 108 has a standalone health score of 1, the data analytics platform 106 may determine root node 108 to have a respective health score $HS_{108}=0.96$.

To determine the "overall" health score for the intermediate node 110c, the data analytics platform 106 may then apply an aggregation function to the set of values that includes the "standalone" health score for the intermediate node 110c and the health score for each child node (i.e., the first edge node 112d and second edge node 112e) of the intermediate node 110c. In this example, the aggregation function applied is a "mean" of the "standalone" health score for the intermediate node 110c, the health score for first edge node 112d, and the health score for second edge node 112e. Thus, the "overall" health score for the intermediate node 110c is 0.67.

The data analytics platform 106 may determine the respective health scores for the nodes in the manufacturing network 102 in various other manners as well.

Referring back to FIG. 6, at block 606, the data analytics platform 106 may use the respective health scores for the nodes in the manufacturing network 102 as a basis to identify any one or more nodes in the manufacturing network 102 that appear to be anomalous. The data analytics platform 106 may perform this function in various manners.

In one implementation, the data analytics platform 106 may compare each node's respective health score to a health score threshold that serves as a dividing line between health scores associated with normally operating nodes and health scores associated with anomalous nodes, where nodes having health scores that fall below the health score threshold are then are considered to be anomalous. In this respect, the health score threshold may take various forms. In one example, the data analytics platform 106 may apply a single health score threshold to all nodes in the manufacturing network 102. In another example, the data analytics platform 106 may apply a different health score threshold to each different type of nodes (e.g., a first health score threshold for edge nodes 112, a second health score threshold for intermediate nodes 110, etc.). As yet another example, the data analytics platform 106 may apply a different health score threshold to each individual node in the manufacturing network 102. The health score threshold(s) applied by the data analytics platform 106 may take other forms as well.

In an implementation where the data analytics platform 106 is configured to apply a different health score threshold to each individual node in the manufacturing network 102, the respective health score threshold for each node may be defined in various manners. As one possibility, the data analytics platform 106 may define a respective health score threshold for a given node based on an evaluation of a recent set of health score determinations for the given node, such as the health score determinations that have been made for the given node over some recent period of time. For instance, the data analytics platform 106 may first apply an aggregation function a recent set of health score determinations for the given node, such as a function that determines a mean, median, mode, maximum, minimum, etc. of the recent set of health score determinations for the given node. In turn, the data analytics platform 106 may use the aggregated value resulting from this aggregating function (which may be referred to as a "baseline" health score for the given node) to set the respective health score threshold for the given node. For example, the data analytics platform 106 may set the respective health score threshold for the given node to be some amount below the "baseline" health score for the given node (e.g., one standard deviation). The data analytics platform 106 may define the respective health score threshold for the given node in other manners as well.

At block 608, the data analytics platform 106 may then cause at least one client station (e.g., client station 116) to present a report of the one or more nodes in the manufacturing network 102 that are identified to be anomalous. This report may take various forms.

In one implementation, the one or more nodes identified to be anomalous may be ranked and sorted in the report according to relative position of the one or more nodes in the manufacturing network 102, where an identified node that is positioned closer to the top of the manufacturing network 102 is ranker higher than an identified node that is positioned closer to the bottom of the manufacturing network 102. For example, if the one or more nodes identified to be anomalous include at least one edge node 112 and at least one intermediate node 110, the at least one intermediate node 110 would be listed higher in the report than the at least one edge node 112.

Additionally, if there are multiple nodes identified to be anomalous that have the same relative position in the manufacturing network 102 (i.e., are on the same level of the manufacturing network's topology), these nodes may be further ranked and sorted in the report according to the nodes' respective numbers of child nodes, where a node having a higher number of child nodes would be listed higher in the report than a node having a lower number of child nodes.

Additionally yet, if there are multiple nodes identified to be anomalous that have the same relative position in the manufacturing network 102 and have the same number of child nodes, these nodes may be further ranked and sorted in the report according to the respective health scores of the nodes, where a node having a lower respective health score would be listed higher in the report than a node having a higher respective health score.

The report of the one or more nodes in the manufacturing network 102 that are identified to be anomalous may take various other forms as well.

In practice, the data analytics platform 106 cause the report to be presented by transmitting, to the client station, data indicative of the report that is to be presented to a user, perhaps along with an instruction to display the report. The data analytics platform 106 may identify the client station to which this data is sent in various manners. As one example, the data analytics platform 106 may identify a client station that is associated with an individual responsible for overseeing the manufacturing network 102 and then the data indicative of the report to this client station, in which case the report may be included as part of an alert (or the like) sent to the individual responsible for overseeing the manufacturing network 102. As another example, the data analytics platform 106 may receive a request from a given client station for the report and then send the data indicative of the report to the requesting client station in response to that request. Other examples are possible a well.

Once the client station presents the sorted report of the one or more nodes in the manufacturing network 102 that are identified to be anomalous, an individual responsible for overseeing the manufacturing network 102 may then use the report to more efficiently identify and address the root cause of the manufacturing network's anomalous operation, which may provide several advantages, including a reduction in costly downtime of the manufacturing network 102.

After identifying nodes in the manufacturing network 102 that appear to be anomalous, the platform may take other actions as well. For example, the data analytics platform 106 may also send a command to the manufacturing network 102 that causes an anomalous node to be shutdown, restarted, and/or disconnected. In another example, the data analytics platform 106 can isolate the anomalous node and request activation of redundant standby nodes to help self-healing of the network. The data analytics platform 106 may also generate a list of anomalous nodes and/or anomalous segments, and the data analytics platform 106 may end out an alert directly to an operator on or off site in the event that a certain network health score threshold is reached. The alert will in turn enable the manufacturing network personnel to reduce the time to diagnose the sub-par performance of the network. In addition, the data analytics platform 106 may be configured to communicate health score to a user interface (e.g., the user interface of client station 116) displaying network health in real time. Other examples are possible as well.

While the disclosed processes, systems, and devices are described in the context of manufacturing networks, it should also be understood that disclosed processes, systems, and devices may be used to monitor the operation of and/or identify anomalies within any other type of data network that has similar characteristics to a manufacturing network (e.g., any data network that has a tree-like topology of nodes).

VI. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

What is claimed is:

1. A computing system comprising:
   a network interface;
   at least one processor;
   a non-transitory computer-readable medium; and
   program instructions stored on the non-transitory computer-readable medium that are executable by the at least one processor to cause the computing system to:
   obtain operating data for a manufacturing network arranged in a hierarchy having a plurality of different levels, wherein the manufacturing network comprises a plurality of edge nodes, a plurality of intermediate nodes, and a root node;
   based on the operating data, determine a respective critical state indicator for each node in at least a given segment of the manufacturing network that includes nodes from at least two different levels of the manufacturing network;
   based on the respective critical state indicator for each node in the given segment of the manufacturing network, recursively determine a respective health score for each node in the given segment of the manufacturing network on a level-by-level basis beginning with a lowest level of given segment and ending with a highest level of the given segment, wherein (1) if a given node in the given segment of the manufacturing network is an edge node in the manufacturing network, the determination of a respective health score for the given node is based on the respective critical state indicator for the given node, (2) if a given node in the given segment of the manufacturing network is an intermediary node in the manufacturing network having one or more nodes that sit beneath the intermediate node at one or more lower levels of the manufacturing network, the determination of a respective health score for the given node is based on the respective critical state indicator for the given node and the respective critical state indicator for each of the one or more nodes that sit beneath the given node in the manufacturing network, and (3) if a given node in the given segment of the manufacturing network is the root node in the manufacturing network, the determination of a respective health score for the given node is based on the respective critical state indicator for the given node and the respective critical state indicator for each other node in the manufacturing network;

based on the respective health score for each node in the given segment of the manufacturing network, identify one or more nodes in the given segment of the manufacturing network that are anomalous; and cause a client station to present a report of the one or more nodes that are identified to be anomalous.

2. The computer system of claim 1, wherein the operating data comprises data values of a given set of operating metrics for each node in at least the given segment of the manufacturing network.

3. The computer system of claim 2, wherein the given set of operating metrics comprises one or more of an amount of transmission delays to and from a node, an extent of transmission losses to and from a node, an amount of bandwidth consumed by a node, an amount of throughput of a node, or an amount of computer-resource utilization of a node.

4. The computer system of claim 1, wherein the program instructions that are executable by the at least one processor to cause the computing system to determine the respective critical state indicator for each node in the given segment of the manufacturing network comprise program instructions stored on the non-transitory computer-readable medium that are executable by the at least one processor to cause the computing system to:

access a set of recent values of a select operating metric for a given node;

determine whether a most-recent value of the select operating metric for the given node is an outlier relative to the accessed set of recent values; and set the respective critical state indicator for the given node to (i) a value of 1 if the most-recent value of the select operating metric for the given node is determined to be an outlier relative to the accessed set of recent values and (ii) a value of 0 if the most-recent value of the select operating metric for the given node is determined not to be an outlier relative to the accessed set of recent values.

5. The computer system of claim 4, wherein the program instructions that are executable by the at least one processor to cause the computing system to determine whether the most-recent value of the select operating metric for the given node is an outlier relative to the accessed set of recent values comprise program instructions stored on the non-transitory computer-readable medium that are executable by the at least one processor to cause the computing system to:

apply an interquartile range (IQR) rule to the accessed set of recent values of the select operating metric for the given node.

6. The computer system of claim 1, wherein the determination of a respective health score for a given node in the given segment of the manufacturing network that is an edge node in the manufacturing network involves:

taking the complement of the respective critical state indicator for the given node.

7. The computer system of claim 1, wherein the determination of a respective health score for a given node in the manufacturing network that is an intermediate node in the manufacturing network involves:

determining a respective health score for each edge node included in the one or more nodes that sit beneath the given node in the manufacturing network by taking the complement of the respective critical state indicator for the edge node;

while proceeding upstream in the given segment of the manufacturing network from each edge node to the given node, recursively determining a respective health score for any intermediate node included in the one or more nodes that sit beneath the given node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

8. The computer system of claim 1, wherein the determination of a respective health score for a given node in the manufacturing network that is the root node in the manufacturing network involves:

determining a respective health score for each edge node in the manufacturing network by taking the complement of the respective critical state indicator for the edge node;

while proceeding upstream in the manufacturing network from each edge node to the given node, recursively determining a respective health score for each intermediate node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

9. The computer system of claim 1, wherein the program instructions that are executable by the at least one processor to cause the computing system to identify one or more nodes in the given segment of the manufacturing network that are anomalous based on the respective health score for each node in the given segment of the manufacturing network comprise program instructions stored on the non-transitory computer-readable medium that are executable by the at least one processor to cause the computing system to:
 compare the respective health score for each node in the given segment of the manufacturing network to a health score threshold;
 identify, as anomalous, any node in the given segment of the manufacturing network having a respective health score that falls below the health score threshold.

10. The computer system of claim 1, wherein the program instructions that are executable by the at least one processor to cause the computing system to identify one or more nodes in the given segment of the manufacturing network that are anomalous based on the respective health score for each node in the given segment of the manufacturing network comprise program instructions stored on the non-transitory computer-readable medium that are executable by the at least one processor to cause the computing system to:
 access a set of recently-determined health scores for a given node in the given segment of the manufacturing network;
 apply an aggregation function to the accessed set of recently-determined health scores for the given node and thereby determine a baseline health score for the given node; and
 identify the given node as anomalous if a most-recently-determined health score for the given node falls below the baseline health score for the given node by a given amount.

11. The computer system of claim 1, wherein the program instructions that are executable by the at least one processor to cause the computing system to cause the client station to present a report of the one or more nodes that are identified to be anomalous comprise program instructions stored on the non-transitory computer-readable medium that are executable by the at least one processor to cause the computing system to:
 cause the client station to present a report in which the identified one or more nodes are ranked according to relative position of the identified one or more nodes within the hierarchy of the manufacturing network, wherein an identified node that is positioned closer to the top of the manufacturing network is ranked higher than an identified node that is positioned closer to the bottom of the manufacturing network.

12. The computer system of claim 11, wherein identified nodes that have the same relative position within the hierarchy of the manufacturing network are further ranked according to one or both of the respective numbers of child nodes of the identified nodes or the respective health scores of the identified nodes.

13. A computer-implemented method comprising:
 obtaining operating data for a manufacturing network arranged in a hierarchy having a plurality of different levels, wherein the manufacturing network comprises a plurality of edge nodes, a plurality of intermediate nodes, and a root node;
 based on the operating data, determining a respective critical state indicator for each node in at least a given segment of the manufacturing network that includes nodes from at least two different levels of the manufacturing network;
 based on the respective critical state indicator for each node in the given segment of the manufacturing network, recursively determining a respective health score for each node in the given segment of the manufacturing network on a level-by-level basis beginning with a lowest level of given segment and ending with a highest level of the given segment, wherein (1) if a given node in the given segment of the manufacturing network is an edge node in the manufacturing network, the determining of a respective health score for the given node is based on the respective critical state indicator for the given node, (2) if a given node in the given segment of the manufacturing network is an intermediary node in the manufacturing network having one or more nodes that sit beneath the intermediate node at one or more lower levels of the manufacturing network, the determining of a respective health score for the given node is based on the respective critical state indicator for the given node and the respective critical state indicator for each of the one or more nodes that sit beneath the given node in the manufacturing network, and (3) if a given node in the given segment of the manufacturing network is the root node in the manufacturing network, the determining of a respective health score for the given node is based on the respective critical state indicator for the given node and the respective critical state indicator for each other node in the manufacturing network;
 based on the respective health score for each node in the given segment of the manufacturing network, identifying one or more nodes in the given segment of the manufacturing network that are anomalous; and
 causing a client station to present a report of the one or more nodes that are identified to be anomalous.

14. The computer-implemented method of claim 13, wherein the operating data comprises data values of a given set of operating metrics for each node in at least the given segment of the manufacturing network, and
 wherein the given set of operating metrics comprises one or more of an amount of transmission delays to and from a node, an extent of transmission losses to and from a node, an amount of bandwidth consumed by a node, an amount of throughput of a node, or an amount of computer-resource utilization of a node.

15. The computer-implemented method of claim 13, wherein determining the respective critical state indicator for each node in the given segment of the manufacturing network comprises:
 accessing a set of recent values of a select operating metric for a given node;
 determining whether a most-recent value of the select operating metric for the given node is an outlier relative to the accessed set of recent values; and
 setting the respective critical state indicator for the given node to (i) a value of 1 if the most-recent value of the select operating metric for the given node is determined to be an outlier relative to the accessed set of recent values and (ii) a value of 0 if the most-recent value of the select operating metric for the given node is determined not to be an outlier relative to the accessed set of recent values.

16. The computer-implemented method of claim 13, wherein the determining of a respective health score for a given node in the manufacturing network that is an intermediate node in the manufacturing network involves:
- determining a respective health score for each edge node included in the one or more nodes that sit beneath the given node in the manufacturing network by taking the complement of the respective critical state indicator for the edge node;
- while proceeding upstream in the given segment of the manufacturing network from each edge node to the given node, recursively determining a respective health score for any intermediate node included in the one or more nodes that sit beneath the given node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and
- determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

17. The computer-implemented method of claim 13, wherein the determining of a respective health score for a given node in the manufacturing network that is the root node in the manufacturing network involves:
- determining a respective health score for each edge node in the manufacturing network by taking the complement of the respective critical state indicator for the edge node;
- while proceeding upstream in the manufacturing network from each edge node to the root given node, recursively determining a respective health score for each intermediate node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and
- determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

18. A non-transitory computer-readable storage medium having program instructions stored thereon that are executable to cause a computing system to:
- obtain operating data for a manufacturing network arranged in a hierarchy having a plurality of different levels, wherein the manufacturing network comprises a plurality of edge nodes, a plurality of intermediate nodes, and a root node;
- based on the operating data, determine a respective critical state indicator for each node in at least a given segment of the manufacturing network that includes nodes from at least two different levels of the manufacturing network;
- based on the respective critical state indicator for each node in the given segment of the manufacturing network, recursively determine a respective health score for each node in the given segment of the manufacturing network on a level-by-level basis beginning with a lowest level of given segment and ending with a highest level of the given segment, wherein (1) if a given node in the given segment of the manufacturing network is an edge node in the manufacturing network, the determination of a respective health score for the given node is based on the respective critical state indicator for the given node, (2) if a given node in the given segment of the manufacturing network is an intermediary node in the manufacturing network having one or more nodes that sit beneath the intermediate node at one or more lower levels of the manufacturing network, the determination of a respective health score for the given node is based on the respective critical state indicator for the given node and the respective critical state indicator for each of the one or more nodes that sit beneath the given node in the manufacturing network, and (3) if a given node in the given segment of the manufacturing network is the root node in the manufacturing network, the determination of a respective health score for the given node is based on the respective critical state indicator for the given node and the respective critical state indicator for each other node in the manufacturing network;
- based on the respective health score for each node in the given segment of the manufacturing network, identify one or more nodes in the given segment of the manufacturing network that are anomalous; and
- cause a client station to present a report of the one or more nodes that are identified to be anomalous.

19. The non-transitory computer-readable storage medium of claim 18, wherein the determination of a respective health score for a given node in the manufacturing network that is an intermediate node in the manufacturing network involves:
- determining a respective health score for each edge node included in the one or more nodes that sit beneath the given node in the manufacturing network by taking the complement of the respective critical state indicator for the edge node;
- while proceeding upstream in the given segment of the manufacturing network from each edge node to the given node, recursively determining a respective health score for any intermediate node included in the one or more nodes that sit beneath the given node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and
- determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

20. The non-transitory computer-readable storage medium of claim 18, wherein the determination of a respective health score for a given node in the manufacturing network that is the root node in the manufacturing network involves:

determining a respective health score for each edge node in the manufacturing network by taking the complement of the respective critical state indicator for the edge node;

while proceeding upstream in the manufacturing network from each edge node to the given node, recursively determining a respective health score for each intermediate node in the manufacturing network by (1) taking the complement of the respective critical state indicator for the intermediate node and thereby determining a standalone health score for the intermediate node, and (2) applying an aggregation function to a set of values that includes the standalone health score for the intermediate node and the respective health score for each child node of the intermediate node; and determining the respective health score for the given node by (1) taking the complement of the respective critical state indicator for the given node and thereby determining a standalone health score for the given node, and (2) applying an aggregation function to a set of values that includes the standalone health score for the given node and the respective health score for each child node of the given node.

\* \* \* \* \*